Oct. 5, 1965   E. J. CYR ETAL   3,210,447
PROCESS FOR MAKING PATTERNED FOAM PADDING MATERIAL
Filed July 8, 1963   2 Sheets-Sheet 2

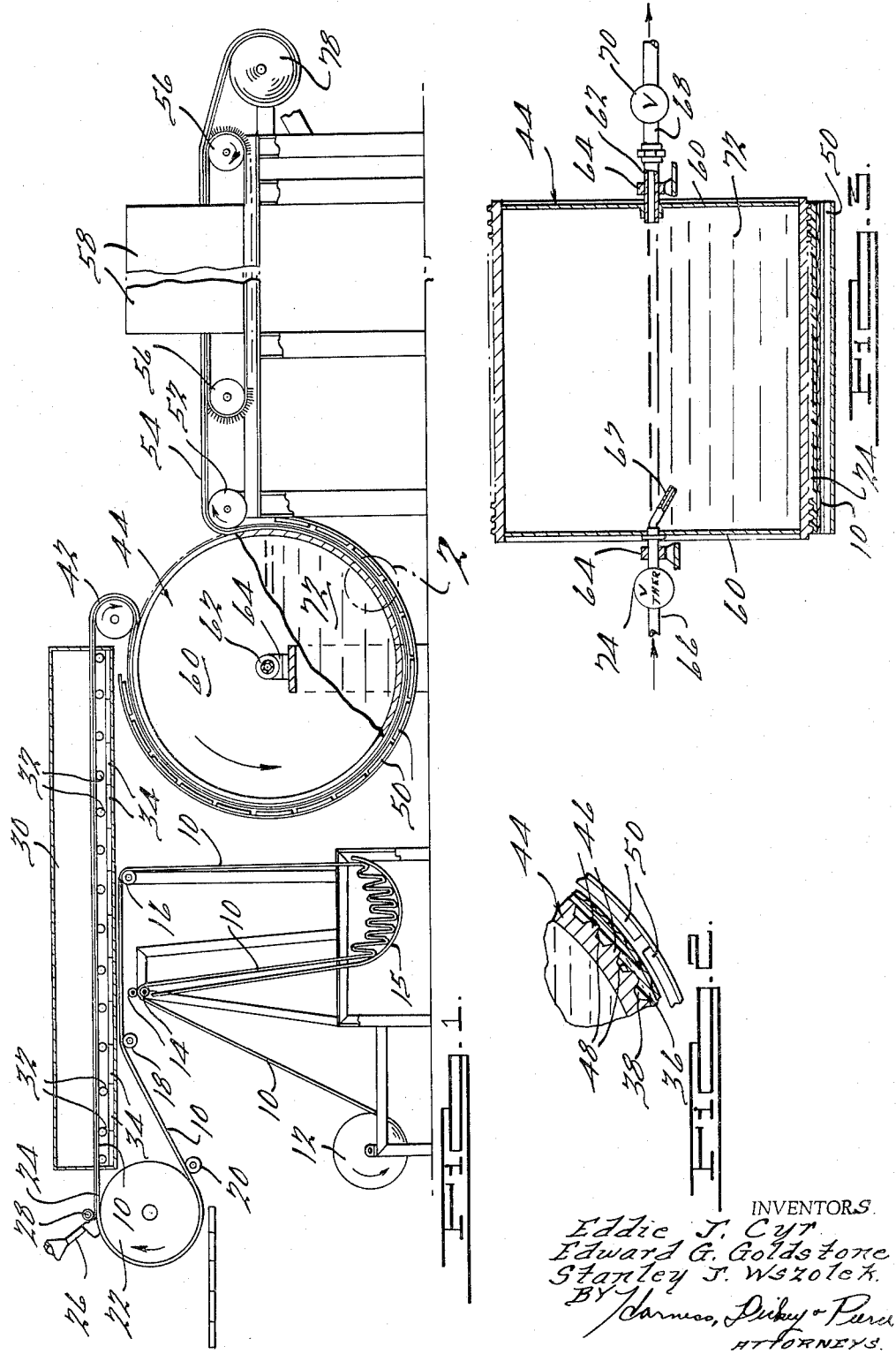

INVENTORS.
Eddie J. Cyr.
Edward G. Goldstone
Stanley J. Wszolek.
BY Harness, Dickey & Pierce
ATTORNEYS.

United States Patent Office 3,210,447
Patented Oct. 5, 1965

3,210,447
PROCESS FOR MAKING PATTERNED FOAM PADDING MATERIAL
Eddie J. Cyr, Cranford, N.J., Edward G. Goldstone, Huntington Woods, Mich., and Stanley J. Wszolek, Clark, N.J., assignors to Allen Industries, Inc., Detroit, Mich., a corporation of Delaware
Filed July 8, 1963, Ser. No. 293,430
5 Claims. (Cl. 264—47)

The present invention broadly relates to a process for making a continuous sheet of composite material comprising a fabric backing sheet to one surface of which a patterned cellular latex foam material is tenaciously bonded.

The patterned composite sheet material made in accordance with the process comprising the present invention is applicable for a wide variety of uses and is particularly suitable as a cushioning or under-padding material for use beneath floor covering materials such as carpeting and the like. The composite patterned latex foam and fabric material possesses many advantages over other fibrous, sponge rubber and cellular materials of the types heretofore known. Widespread commercialization and use of such patterned latex foam composite material has, however, been hampered due to the lack of a method and apparatus for producing the material in a commercially economical trouble-free, and continuous manner.

Several methods and apparatuses have heretofore been used or proposed for use for making composite patterned cellular sheet material via both batch type and continuous type processes. Batch type operations have been found commercially unsatisfactory due to the high capital expenditure in equipment required in comparison to a relatively low production capacity. Continuous processes of the types heretofore known on the other hand, have not provided the requisite flexibility and versatility commercially required for making a range of different thickness composite sheet materials as is required in accordance with variations in their intended end uses without necessitating substantial modifications and changes to the processing equipment requiring prolonged shutdown periods for achieving a conversion of the apparatus resulting in an increased expenditure for capital equipment and a substantial reduction in the operating efficiency and economy of the process. In addition to the foregoing, continuous type processes of the types heretofore known require extremely rigorous control and careful supervision to maintain satisfactory operation which is commercially impractical and, moreover, are susceptible to frequent malfunction resulting in prolonged process interruptions and material scrappage which seriously detract from the commercial use thereof.

One of the continuous type processes heretofore proposed for use employs a patterned roll around which a backing sheet is advanced and ungelled latex foam is fed directly and tangentially between the periphery of the roll and the backing material fed around the drum. The material is heated from without and from within the drum to effect gellation of the foam before it is stripped from the drum. In accordance with this process and apparatus, difficulty has been encountered in preventing bleed through of the foam to the outer face of the backing material as well as adhesion or sticking of the gelled material to the periphery of the roll resulting in imperfections in the composite sheet produced as well as necessitating periodic stoppages for cleaning the roll surface. In addition to the foregoing, the process necessitates changes in the roll used each time a sheet of a different thickness is required necessitating the stocking of a multitude of rolls and encountering substantial period of down time required for converting the apparatus from one roll to another.

It is accordingly, a principal object of the present invention to provide an improved process for making a composite patterned latex foam material bonded to one face of a backing sheet which overcome the problems and disadvantages present in processes of similar type heretofore known.

Another object of the present invention is to provide an improved process for producing continuous sheets of a patterned composite latex foam material which provide for greater flexibility and versatility in the manufacture of such composite sheets of varying thicknesses through relatively simple changes in the conditions of operation without requiring replacement of the roll providing thereby a significant improvement in the efficiency and economy of operation.

Still another object of the present invention is to provide an improved process for producing composite patterned latex foam sheet material which substantially completely eliminate any bleed through of the latex foam to the exposed surface of the backing sheet.

A further object of the present invention is to provide an improved process for producing a continuous composite patterned latex foam sheet material which is of substantially uniform thickness and composition throughout its length and width.

A still further object of the present invention is to provide an improved process for producing composite patterned latex foam material that employs a controlled temperature differential between the molding roll and latex foam layer which substantially completely eliminates any adhering or sticking tendency of the gelled foam layer to the periphery of the roll facilitating quick and complete stripping of the material therefrom and obviates the necessity of frequent cleaning of the periphery of the roll.

Yet still another object of the present invention is to provide an improved process for making composite patterned latex foam sheet material of a substantially large width and of a continuous length and which process and apparatus is of simple and economical construction, control, and operation.

The foregoing and other objects and advantages of the present invention are based on the discovery that high quality composite patterned latex foam sheet materials can be produced by applying a layer of ungelled latex foam of a predetermined thickness on one face of a continuously moving backing sheet which thereafter is heated in a controlled manner so as to effect a partial or substantially complete gelling of a stratum of the foam layer adjacent to the backing sheet retaining a substantially ungelled upper stratum of latex foam thereabove which thereafter is moved into contact with a molding roll having a patterned peripheral surface effecting a flow of the ungelled stratum to conform with the roll pattern. Heat is applied exteriorly of the drum to effect a gelling of the balance of the foam layer while in contact with the peripheral surface of the drum followed thereafter by a stripping of the patterned gelled layer from the drum and a curing thereof into a finished product. The substantially complete absence of any adhering tendency of the gelled latex foam layer to the peripheral surface of the molding roll is based on a second discovery that by cooling the roll within a prescribed temperature range which is below the temperature of the foam layer in contact therewith effects condensation of a thin film of water on the surfaces of the pattern embossed in the peripheral surface of the roll enhancing the release and stripping of the gelled molded latex foam layer therefrom.

Other objects, features, and advantages of the present invention will become apparent from the subsequent description, taken in conjunction with the accompanying drawings, wherein:

FIGURE 1 is a schematic side elevation view of the appartus for producing a continuous sheet of composite patterned latex foam material arranged in accordance with the preferred embodiments of the present invention;

FIG. 2 is an enlarged fragmentary sectional view of the disposition of the latex foam layer on the patterned peripheral surface of the forming roll as taken in the encircled area indicated at 2 of FIGURE 1;

FIG. 3 is a fragmentary longitudinal sectional view through the forming roll shown in FIGURE 1 and illustrating the conduits for supplying a cooling liquid to the interior of the drum;

Figure 5:
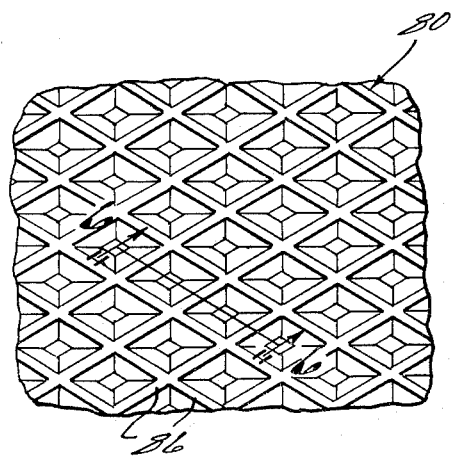
FIG. 5 is a fragmentary plan view of a typical pattern of latex foam cushioning material made in accordance with the apparatus as shown in FIGURE 1.
Figure 6:
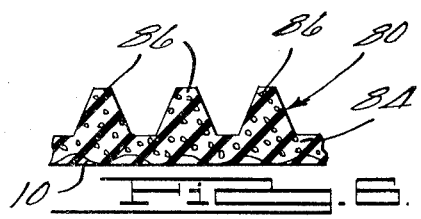
FIG. 6 is a fragmentary vertical sectional view through the padding material shown in FIGURE 5 and taken substantially along the line 6—6 thereof.
Figure 7:
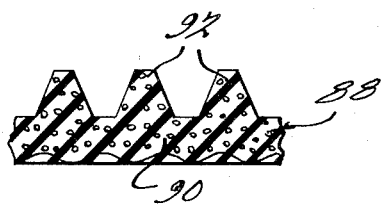
Figure 8:
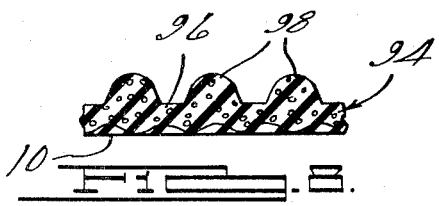

FIG. 7 is a fragmentary vertical sectional view of a composite patterned latex foam material having a thickness greater than the padding material shown in FIGURE 6, and FIG. 8 is a fragmentary vertical sectional view of a composite patterned latex foam material which can satisfactorily be made from the same forming roll employed for the padding materials illustrated in FIGURES 5–7 but having a smaller thickness consistent with its intended end use.

Referring now in detail to the drawings and as best shown in FIGURE 1, the apparatus and process for producing a continuous composite patterned latex foam material tenaciously adhered to an underlying base material is of the continuous type wherein a suitable backing strip is continuously fed from a feed roll, is coated with a preselected thickness of ungelled latex foam, is partially gelled, molded on a forming drum, and thereafter cured producing a composite sheet having the desired thickness and patterned surface thereon. As shown in FIGURE 1, a suitable backing sheet 10 in continuously unwound from a feed roll 12 by a pair of drive rolls 14 disposed in engagement with each surface of the backing sheet. The backing sheet 10 thereafter passes into a so-called "J-frame" indicated at 15 in which a surplus of loosely folded backing sheet material is accumulated and is withdrawn therefrom over idler rolls 16 and 18 and thence over a nip roll 20 from which the material passes around the underside of a backing roll 22. As the backing sheet 10 is advanced around the backing roll 22, a continuous layer 24 of ungelled latex foam is applied to the upper surface thereof by means of a traversing supply nozzle 26. The latex foam layer 24 is distributed substantially uniformly across the width of the backing sheet 10 in a preselected thickness as controlled by a suitable doctor roll indicated at 28 disposed adjacent to the discharge outlet of the nozzle 26.

The backing sheet 10 having the latex foam layer 24 on the upper surface thereof passes from between the backing roll 22 and doctor roll 28 into a tunnel oven 30 which is provided with a plurality of longitudinally spaced idler rollers 32 for supporting the sheet in a substantially flat condition. The tunnel oven 30 is provided with a plurality of radiant heating panels indicated at 34 which are disposed beneath the backing sheet 10 and are oriented to radiate heat upwardly against the uncoated underside of the backing sheet 10 and the lower stratum of the latex foam layer 24 positioned adjacent to the upper surface of the backing sheet. Alternative satisfactory heating devices can be employed which are effective to provide a concentration of heat at the underside of the backing sheet 10 thereby effecting a controlled partial or substantially complete gelling of the lower stratum of the latex foam layer to a predetermined depth adjacent to the backing sheet without elevating the temperature of the balance of the upper stratum of the latex foam layer to the extent that gellation thereof also occurs. Electrically energized radiant heating panels comprising a high resistance coating on an electrically insulating substrate such as glass, for example, have been found particularly suitable for this purpose in providing the requisite flexibility in control to achieve the proper heat transmission to the underside of the latex foam layer.

Figure 4:
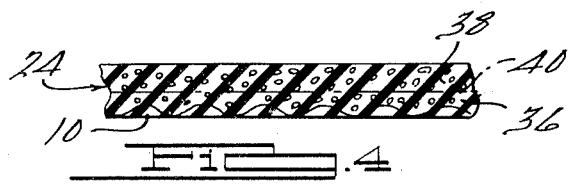
FIG. 4 is a fragmentary vertical sectional view of the backing strip having a layer of latex foam thereon the lower stratum of which has been pregelled.

The intensity of the heat directed against the underside of the backing sheet 10 having the latex foam layer 24 on the upper face thereof and the temperature of the surrounding air in the tunnel oven 30 is controlled in consideration of such variables as the gell sensitivity of the latex foam layer, the speed of travel of the latex foam-coated backing sheet 10 through the tunnel oven, and the length of the tunnel oven. The duration and heat intensity are controlled so as to condition the coated sheet prior to the subsequent molding operation to partially or substantially completely gell the lower stratum of the latex foam layer immediately adjacent to the backing sheet 10. A latex foam-coated backing sheet which has been conditioned in the tunnel oven 30 is illustrated in FIGURE 4, wherein the lower stratum indicated at 36 disposed in contact with the backing sheet 10 is partially or substantially completely gelled whereas the upper stratum indicated at 38 of the latex foam layer 24 is in a substantially ungelled moldable condition. The demarcation between the lower stratum 36 and the upper stratum 38 of the foam layer is indicated in FIGURE 4 by the dotted line 40. It will be appreciated that in actual practice the line of demarcation between the lower and upper stratum of the latex foam layer is not as precise as indicated by the dotted line 40 but instead comprises a transition width of foam of a progressively reduced degree of gell which straddles the line 40 indicated in FIGURE 4.

In accordance with the aforementioned variables and considerations, it has been found that heating the underside of the latex foam-coated backing sheet 10 to a temperature of about 300° F. and controlling the temperature of the surrounding air in contact with the upper surface of the latex foam layer 24 at about 150° F. for a dwell time period within the tunnel oven ranging from about 15 seconds up to about 1 minute employing a latex foam formulation having a gell time at room temperature ranging from 3 to 6 minutes effects the partial or substantially complete gellation of a lower stratum having a thickness of about 25% of the total thickness of the foam layer applied while retaining the upper stratum in an ungelled moldable condition.

The relatively rapid localized gelling of the lower stratum of the latex foam layer prevents bleed through of the latex foam to the underside or exposed surface of the backing sheet 10 which is objectionable not only from an appearance standpoint but also causes irregularities in the thickness and physical characteristics of the resultant cushioning material. The pre-gelled lower stratum moreover controls the thickness of the web of the resultant cured cushioning material and also prevents or resists penetration of the pattern peaks on the peripheral surface on the roll down to the inner face of the backing sheet 10.

The backing sheet 10 having thereon the preconditioned latex foam layer 24 immediately on emergence from the tunnel oven 30 passes around a nip roll 42 and is thereafter disposed with its latex foam layer in contact with the patterned periphery of a molding or forming roll 44. The peripheral surface of the nip roll 42 is spaced from the peripheral surface of the forming roll 44 a distance corresponding substantially to the thickness of the backing sheet 10 and the thickness of the pre-gelled lower stratum 36 such that only the upper stratum 38 comprising the substantially ungelled moldable latex foam is caused to flow and fill the patterned indentations in the forming roll 44 effecting a molding thereof to the requisite configuration.

It will be appreciated that the free flowing displacement of the latex foam in the upper stratum consistent with the patterned configuration effects an increase in the total thickness of the molded sheet in comparison to the original thickness of the unmolded latex foam layer 24 as shown in FIGURE 4. The volume of latex foam in the upper stratum 38 is established by controlling the total thickness of the latex layer 24 applied and the thickness of the pre-gelled lower stratum 36 to effect a substantially complete or a controlled partial filling of the recesses of the forming roll pattern consistent with the nature of the cushioning material desired as will subsequently be described in detail.

Then pattern on the peripheral surface of the forming roll 44 may be of any desired configuration such as, for example, a waffle-type configuration or a diamond-shaped configuration providing a resultant molded latex foam layer of a configuration as shown in FIGURES 5 and 6. This configuration is achieved by a repetitive pattern on the peripheral surfaces of the forming roll as best seen in FIGURES 2 and 3 comprising a plurality of tapered diamond-shaped projections 46 separated by outwardly tapered diamond shaped cavities indicated at 48. In the exemplary condition as shown in FIGURE 2, the ungelled upper stratum 38 of the latex foam flows inwardly substantially completely filling the cavities 48 and in which condition the latex foam is completely gelled by a plurality of radiant heating panels 50 positioned around and disposed close to the uncoated outer surface of the backing sheet 10. The intensity of the radiant heat applied to the molded latex foam layer is controlled so as to effect substantially complete gelling of the entire layer before the composite sheet is stripped from the periphery of the forming roll 44.

The temperature of the radiant heating panels 50 at a point adjacent to the nip roll 42 is preferably controlled at a higher level than the remaining heating panels to effect a rapid heating of the foam layer to an elevated temperature effecting the rapid initiation of gelling of the molded ungelled foam stratum. The particular temperature to which the latex foam layer is heated will depend on such considerations as the circumferential length of the roll, the speed of rotation thereof, and the gel sensitivity of the latex foam being molded. It has been found that employing radiant heating panels spaced about one inch from the outer surface of the backing sheet 10 and heated at the inlet side of the forming roll to a temperature of about 425° F. with the remaining panels heated to a temperature of about 365° F. providing a total heated length of about 15 feet effects rapid gellation of the foam.

It will be appreciated that the conditioning of the foam in the tunnel oven 30 and the partial or substantially complete gelling of the lower stratum 36 thereof provides a distinct advantage in reducing the time required and/or the size of the molding roll required to effect complete gellation of the foam layer. In accordance with this advantage, a substantially smaller size roll can be satisfactorily employed substantially reducing the capital expenditure and plant space required, or, alternatively, a substantial increase in the rate of production can be obtained for a given size roll. It will be further noted that the pressure applied to the ungelled upper stratum of latex foam to effect a flow thereof into the patterned cavities provided in the periphery of the roll cannot produce or cause bleed through of the ungelled latex foam to the outer surface of the backing sheet due to the barrier provided by the substantially completely gelled lower stratum 36.

The use of a partially or substantially completely pre-gelled lower stratum 36 provides the further advantage as best seen in FIGURE 3 of maintaining the backing sheet 10 in substantially uniform spacing from the peripheral surface of the roll across its entire width thereby preserving uniformity in the thickness of the resulting cushioning material formed. This uniformity is accomplished by the resistance afforded by the pregelled stratum to penetration by the diamond shaped projections 46 on the peripheral surface of the roll as occasioned by variations in the tension of the backing sheet so that the backing sheet remains substantially uniformly spaced along its length and breadth.

The patterned and substantially completely gelled latex foam layer after remaining in contact with the periphery of the roll for almost one complete revolution thereof is stripped therefrom by passing between and around a roll 52 from which the composite sheet indicated at 54 is advanced horizontally therefrom and is engaged by and supported on a continuous pin tenter-type conveyor belt 56 on which it is advanced into a curing oven 58. The ease of stripping the gelled composite sheet 54 from the periphery of the forming roll 44 is accomplished in accordance with the preferred practice of the present invention by maintaining the forming roll 44 at a controlled temperature below that to which the latex foam layer is heated by using a suitable coolant as best seen in FIGURE 3. As shown in this figure, the side or end walls 60 of the forming roll 44 are provided with tubular shafts 62 affixed to the center thereof which are rotatably supported in bearing blocks 64. A suitable cooling fluid such as water, for example, is introduced from a supply line 66 connected to the tubular shaft 62 on the left side of the forming roll 44 as viewed in FIGURE 3, which is introduced into the interior of the forming roll through a swivel nozzle 67. The coolant is drained from the interior of the forming roll 44 through the opposite tubular shaft 62 connected to a drain line 68 provided with a shutoff valve 70 in the exemplary arrangement shown in FIGURE 3. The forming roll is operated in a manner so as to be half full of the coolant liquid indicated at 72 such that the tubular shaft 62 and drain line 68 connected thereto serves as an overflow conduit maintaining the level of coolant liquid in the roll substantially constant.

The quantity of coolant liquid discharged into the interior of the forming roll may be controlled by any one of a variety of devices such as a thermostatically actuated valve indicated at 74 which is operative responsive to the temperature of the coolant liquid 72 within the roll to allow cold cooling liquid to enter the drum responsive to the rise in temperature of the drum to a preselected magnitude. The relatively cold coolant liquid discharged into the interior of the forming roll 44 through the inlet nozzle 67 is uniformly admixed with the body of coolant liquid contained within the roll through the constant rotation of the roll which may be further supplemented by suitable vanes (not shown) affixed to the inner surface of the roll. In accordance with this construction, the peripheral surface of the roll which is of a material of high conductivity such as a steel roll, for example, is maintained at a substantially controlled uniform temperature which is below that of the latex foam layer disposed in contact with the patterned surface and which is heated by the radiant heating panels 50 positioned therearound.

By maintaining the peripheral surface of the roll at a temperature below the boiling point of water and preferably at a temperature below about 140° F., a thin film of water is deposited on the patterned surface of the forming roll by condensation of water driven from the latex foam layer which serves as a release agent enabling simple and complete stripping of the gelled and molded latex foam layer from the surface of the roll. The cooling of the forming roll 44 to a temperature below about 100° F. is generally undesirable because of the large quantity of heat removed from the latex foam layer effecting a reduction in its temperature and retarding its rate of gelling. In accordance with the preferred practice of the present invention wherein the latex foam layer is heated to a temperature between about 250° F. and about 350° F., the peripheral surface of the roll is controlled within a temperature of about 100° F. to about 140° F. and preferably from about 105° F. to about 125° F. Temperatures of the peripheral surface of the roll in excess of about 140° F. have been found undesirable in some instances due to the reduction of the magnitude of the film of water on the surface of the roll because of increased evaporation which has resulted in a tendency of some formulations of latex foam to stick slightly to the patterned surface causing imperfections in the resulting composite sheet. It is also contemplated within the scope of the present invention that the peripheral surface of the forming roll can be provided with a finish thereon such as a chromium plating or halogenated hydrocarbon polymer coating such as polytetrafluoroethylene for example, which further enhances the effectiveness of the release characteristics of the water film.

The composite sheet 54 as shown in FIGURE 1 having the gelled and molded latex foam layer thereon is cured in the curing oven 58 while supported on the tenter frame conveyor 56 producing a finished product characterized in its uniformity in thickness and shape and the integral bonding of the cured foam layer to the backing sheet. The duration of time of the curing step will vary depending on the particular formulation of the latex foam layer applied. Conventionally, cure time periods ranging from about 10 minutes to about 30 minutes at temperatures of from about 250° F. to about 300° F. will effect substantially complete curing of the latex foam layer. The finished cured composite sheet material on passing from the interior of the curing oven 58 may be suitably wound on a takeup roll 78 or cut in preselected lengths as desired.

A typical composite patterned latex foam on fabric cushioning material 80 is illustrated in FIGURES 5 and 6 which is produced in accordance with the process and apparatus hereinbefore described. In the exemplary cushioning material illustrated, the cured latex foam is of a diamond-shaped pattern as defined by a planar web 84 tenaciously adhered at its lower surface to the backing sheet 10 and a plurality of tapered projections 86 extending upwardly and integrally affixed to the planar web 84 and disposed in a substantially diamond-shaped pattern. The thickness of the planar web 84 corresponds substantially to the thickness of the pregelled lower stratum 36 (FIG. 4) and the configuration of the tapered projections 86 correspond substantially to the depth of the cavities 48 (FIG. 2) in the surface of the forming roll 44.

A typical cushioning material for use as an under padding for floor carpeting may range in thickness between about ⅜ to about ½ of an inch. Variations in the thickness of the cushioning material within or beyond the aforementioned range can be simply achieved in accordance with the flexibility and versatility as provided by the process and apparatus comprising the invention. For example, if a cushioning material 88 as shown in FIGURE No. 7 was desired having a total thickness greater than the cushioning material 80 shown in FIGURES 5 and 6, a simple controlled change in the temperature of the tunnel oven 30 is made to effect an increase in the depth of pregelling of the lower stratum 36 of the foam layer coupled by a controlled increase in the total thickness of the foam layer 24 (FIG. 4) applied to the backing sheet 10 such that the resultant cushioning material 88 has a planar web 90 of a correspondingly increased thickness over the planar web 84 of the cushioning material shown in FIGURE 6. The cushioning material 88 will be noted to have tapered projections 92 defining a diamond-shaped pattern and of substantially the same height as the tapered projections 86 of the cushioning material shown in FIGURE 6.

It will be apparent from the foregoing that by controlling the original thickness of the ungelled foam layer applied to the backing sheet 10 and controlling the depth of pregelling of the lower stratum of the foam layer, variations in the thickness of the resultant cushioning material can be achieved with only a minor modification in the controls of the apparatus. It will be appreciated that when the planar web portion of the cushioning material is either increased or decreased, appropriate adjustment of the nip roll 42 is made to correspond to the increased or decreased thickness of the pregelled stratum 36 to provide the desired end results without effecting any embossing or crushing of the foam in the pregelled stratum.

Further reductions in the total thickness of the cushioning material can be achieved while maintaining a constant thickness of the planar web producing a cushioning material 94 as illustrated in FIGURE 8. As shown in FIGURE 8, the cushioning material 94 comprises a planar web 96 tenaciously bonded to the backing sheet 10 and a plurality of tapered projections 98 integrally affixed to and projecting upwardly from the planar web. The tapered projections 98 define a diamond-shaped pattern of a general type shown in FIGURES 5–7, but the height thereof is reduced to a preselected magnitude by controlling the thickness of the ungelled free flowing moldable latex foam in the upper stratum 38 (FIG. 4) such that only a portion of the diamond-shaped cavities 48 (FIG. 2) are filled during the molding operation. In view of the fact that the foam as initially applied is in a layer of substantially uniform thickness, the degree of partial filling of the diamond-shaped cavities 48 will be substantially constant across the entire width of the roll such that the resultant cushioning material 94 will be of substantially uniform thickness throughout its length and breadth.

The process and apparatus as hereinbefore disclosed is applicable for use in connection with either one of a variety of backing sheet materials and latex foam formulations of the types commercially available and well known in the art. The backing sheet material preferably comprises a woven or knitted fabric material of which burlap and other inexpensive relatively open weave materials are preferred due to their relatively low cost. In view of the pregelling operation employed in accordance with the present process, such relatively open weave fabrics can be satisfactorily employed without encountering an objectionable degree of bleed through of the latex foam material to the rearward surface of the backing sheet.

The latex foam composition suitable for use in the present process can comprise any of the latex foam compositions well known in the art which are formulated to include natural and/or synthetic latex, suitable frothing or foaming agents, various types of filler materials if desired, a vulcanizing agent, an activator which is employed for increasing the activity of the vulcanizing agent, suitable accelerators and/or ultra-accelerators generally of the zimate type, gell sensitizing agents, pH regulators, as well as suitable stabilizing agents and antioxidants. The foregoing typical constituents are blended in the form of an aqueous mixture and are preliminarily beaten or frothed to entrap air therein prior to discharge from the supply nozzle on the surface of the moving backing sheet material. The proportions of the foregoing constituents are controlled so as to provide a cured latex foam product having the desired strength, density, and cushioning characteristics. The type and proportions of the gell sensitizers used are controlled so as to provide a gellation in the tunnel oven of the lower stratum of the latex foam layer applied without impairing the moldability characteristics of the upper stratum to enable its molding when advanced into contact with the patterned peripheral surface of the forming roll. In a typical process arrangement it has been found that the adjustment of the ingredients to provide a gell sensitivity which effects gellation of the latex foam within a time period of about 3 to 6 minutes at room temperature is eminently satisfactory for commercial operation. Increases or decreases in the gell sensitivity of the latex foam can be made consistent with considerations of the length of the tunnel oven, the temperature employed therein, the thickness of the latex foam layer applied, the size of the forming roll, etc.

While it will be apparent that the preferred embodiment of the invention disclosed is well calculated to fulfill the objects above stated, it will be appreciated that the

What is claimed is:

1. A method of making a composite patterned latex foam sheet material which comprises the steps of applying a substantially uniform ungelled latex foam layer of a controlled thickness on one surface of a backing sheet, heating said foam layer and controlling the temperature and duration thereof to effect at least partial gellation of said foam layer in a stratum of a controlled thickness adjacent to said sheet while retaining a substantially ungelled moldable stratum thereabove, advancing said sheet with said foam layer thereon into contact with a die having a patterned peripheral surface and molding the ungelled said stratum to conform with the pattern thereon, gelling said foam layer while in contact with said die, stripping said sheet from said die and thereafter curing said latex foam layer forming a composite patterned sheet material.

2. A method of making a composite patterned latex foam sheet material which comprises the steps of applying a substantially uniform ungelled latex foam layer of a controlled thickness on one surface of a backing sheet, heating said foam layer in a region adjacent to said backing sheet and controlling the temperature and duration thereof to effect at least partial gellation of said foam layer in a stratum of a controlled thickness disposed adjacent to said sheet while retaining a substantially ungelled moldable stratum of latex foam thereabove, advancing said sheet with said foam layer thereon into contact with a die having a patterned peripheral surface thereon and molding the ungelled said stratum to conform with the pattern thereon, gelling said layer while in contact with said die by applying heat exteriorly of said die and controlling the temperature of the surface of said die below the boiling point of water, stripping said sheet from said die and thereafter curing said latex foam layer forming a composite patterned sheet material.

3. A method of making a composite patterned latex foam sheet material which comprises the steps of applying a substantially uniform ungelled latex foam layer of a controlled thickness on one surface of a backing sheet, heating said foam layer through the uncoated surface of said backing sheet and controlling the temperature and duration thereof to effect at least partial gellation of said foam layer in a stratum of a controlled thickness disposed adjacent to said sheet while retaining a substantially ungelled moldable stratum of latex foam thereabove, advancing said sheet with said foam layer thereon into contact with a die having a patterned peripheral surface and molding the ungelled said stratum to conform with the pattern thereon, gelling said layer by applying heat to said sheet exteriorly of said die and controlling the temperature of the peripheral surface of said die between about 100° F. to about 140° F., stripping said sheet with the patterned gelled said layer thereon from said die, and thereafter curing said latex foam layer forming a composite patterned sheet material.

4. A method of making a composite patterned latex foam sheet material which comprises the steps of applying a substantially uniform ungelled latex foam layer of a controlled thickness on one surface of a backing sheet, heating said foam layer through the uncoated surface of said backing sheet and controlling the temperature and duration thereof to effect at least a partial gellation of said foam layer in a stratum of a controlled thickness disposed adjacent to said sheet while retaining a substantially ungelled moldable stratum of latex foam thereabove, advancing said sheet with said foam layer thereon into contact with a die having a patterned peripheral surface and molding the ungelled said stratum to conform with the pattern thereon, gelling said layer by applying heat to said sheet exteriorly of said die and controlling the temperature of the peripheral surface of said die between about 105° F. to about 125° F., stripping said sheet with the patterned gelled said layer thereon from said die, and thereafter curing said latex foam layer forming a composite patterned sheet material.

5. A method of making a composite patterned latex foam sheet material which comprises the steps of applying a substantially uniform ungelled latex foam layer of a controlled thickness on one surface of a backing sheet, heating said foam layer in the region adjacent to said backing sheet and controlling the temperature and duration thereof to effect at least partial gellation of said foam layer in a stratum of a controlled thickness disposed adjacent to said sheet while retaining a substantially ungelled moldable stratum of latex foam thereabove, advancing said sheet with said foam layer thereon into contact with a die having a patterned peripheral surface and molding the ungelled said stratum to conform with the pattern on said die without disturbing the gelled said stratum, gelling said foam layer while in contact with said die by applying radiant heat to said sheet exteriorly of said die effecting a heating of said layer between about 250° F. and about 350° F. and cooling said die to maintain the surface thereof below a temperature of about 140° F., stripping said sheet from said die, and thereafter curing said latex foam layer forming a composite patterned sheet material.

References Cited by the Examiner

UNITED STATES PATENTS

| 2,549,864 | 4/51 | Toulmin | 264—47 |
| 2,865,046 | 12/58 | Bird | 264—47 |
| 3,007,205 | 11/61 | House | 264—47 XR |

FOREIGN PATENTS

| 656,533 | 1/63 | Canada. |
| 877,061 | 9/61 | Great Britain. |

ALEXANDER H. BRODMERKEL, *Primary Examiner.*